United States Patent [19]

Kremers et al.

[11] Patent Number: 5,697,596

[45] Date of Patent: Dec. 16, 1997

[54] FLAP VALVE WITH IMPROVED ACTUATOR

[75] Inventors: Karl-Josef Kremers, Nideggen; Bernd Ormanns, Düren; Wolfgang Schawag, Dinslaken, all of Germany

[73] Assignee: Hermann Rappold & Co. GmbH, Düren, Germany

[21] Appl. No.: 524,640

[22] Filed: Sep. 8, 1995

[30] Foreign Application Priority Data

Oct. 13, 1994 [DE] Germany .......................... 44 36 569.1

[51] Int. Cl.[6] .............................. F16K 1/18; F16K 31/12
[52] U.S. Cl. .................... 251/58; 60/39.182; 137/875; 251/298
[58] Field of Search ....................... 137/869, 875; 251/58, 298; 60/39.181, 39.182

[56] References Cited

U.S. PATENT DOCUMENTS

| 2,098,553 | 11/1937 | Reiner | 137/875 |
|---|---|---|---|
| 2,230,775 | 2/1941 | Conway | 137/875 |
| 3,805,884 | 4/1974 | Burt et al. | 137/875 |
| 4,821,507 | 4/1989 | Bachmann et al. | 137/875 |
| 4,919,169 | 4/1990 | Bachmann et al. | 137/875 |
| 5,299,601 | 4/1994 | Koch | 137/875 |

FOREIGN PATENT DOCUMENTS

| 1154233 | 4/1958 | France | 137/875 |
|---|---|---|---|
| 38 13 663 | 11/1989 | Germany . | |
| 40 33 663 | 2/1992 | Germany . | |
| 42 39 423 | 5/1994 | Germany . | |

*Primary Examiner*—George L. Walton
*Attorney, Agent, or Firm*—Wenderoth, Lind & Ponack

[57] ABSTRACT

A flap valve, particularly used for a conductor of large cross section, includes a valve housing and a flap member mounted in the housing for pivoting movement about a first axis through an angle of approximately 90° between two extreme positions. A drive shaft is mounted in the housing for rotation about a second axis, and a tension lever is fixed to the drive shaft and rotatable therewith about the second axis. A joint rod is pivoted at a first end thereof to the tension lever and at a second end thereof to the flap member at a position substantially centrally thereof. Rotation of the drive shaft and the tension lever about the second axis moves the joint rod and thereby pivots the flap member about the first axis from one extreme position to the other. The second axis is positioned relative to the first axis to ensure that an angle of rotation of the tension lever to move the flap member between the two extreme positions thereof is approximately 90° to 150°.

15 Claims, 3 Drawing Sheets

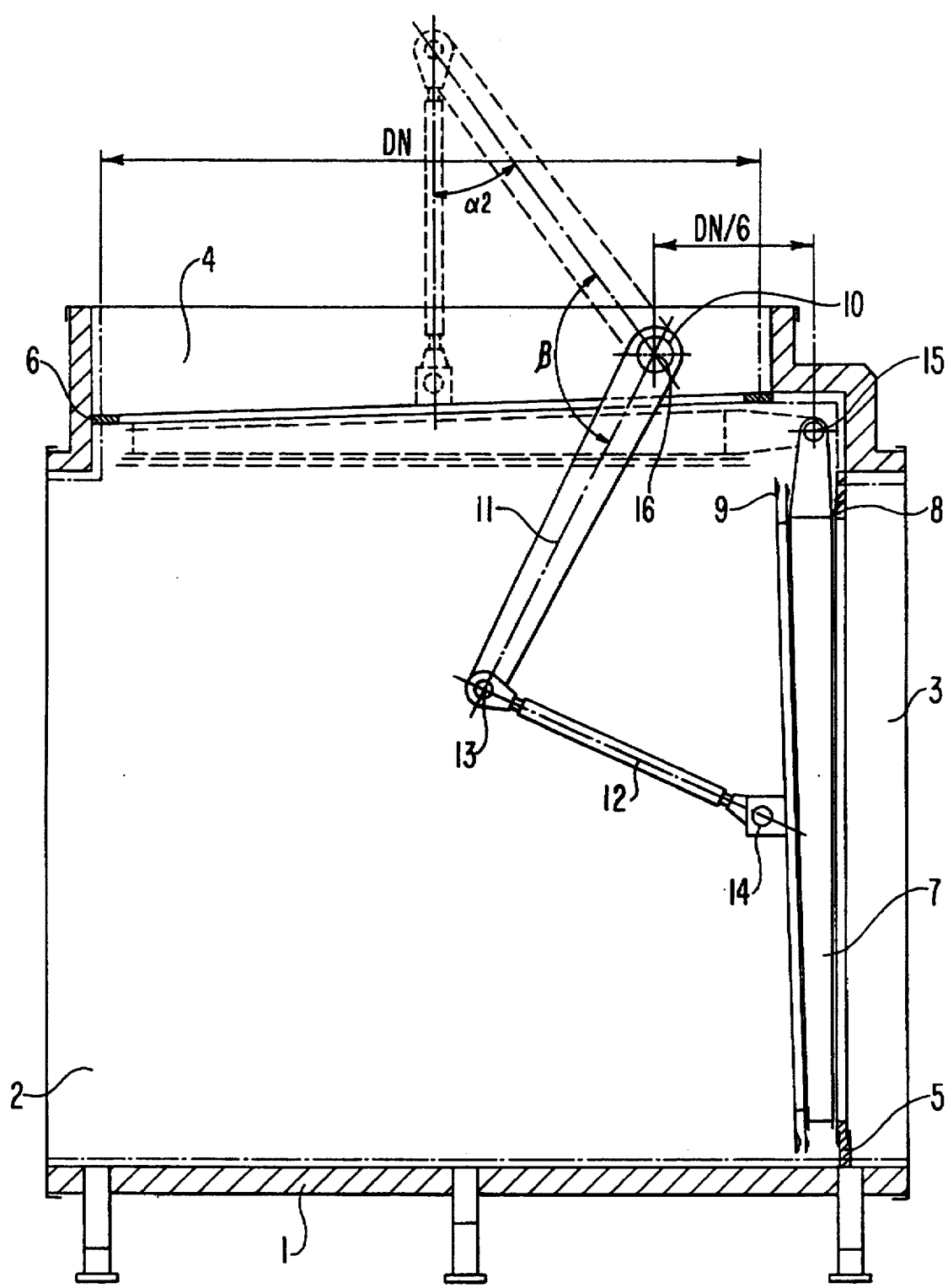

FLAP VALVE WITH IMPROVED ACTUATOR

BACKGROUND OF THE INVENTION

The present invention relates to an improved flap valve structure, particularly of the type for use in a conductor having a large cross section. The present invention particularly relates to such a flap valve including a valve housing and a flap member or wing mounted in the housing for pivoting movement about a first axis through an angle of approximately 90° between two extreme sealing positions for selectively blocking respective conductor passages of the housing. The valve member is actuated between the two extreme positions by a drive shaft mounted on the housing, by a pressure or tension lever fixed to the drive shaft, and by a link rod or joint rod linked at one end thereof substantially centrally axially to the flap member and at the other end thereof to the tension lever.

Flap valves of this type can be used in flue gas purification systems, in gas turbine systems, and in similar systems particularly having conductors of large cross section. Thus, this type of flap valve makes it possible to act on the flap member with a favorable torque thereon, even when the flap member is supported substantially only axially and extends laterally by large dimensions.

This type of flap valve conventionally is moved between extreme positions thereof by acting on the drive shaft by an electrically actuated mechanism, by a double cylinder piston pivot drive valve actuator mechanism, or by plural cylinder piston units controlled by special valve devices for controlling pivoting in opposite directions. An electric drive mechanism of this type is disclosed in DE-OS 38 13 663. A double cylinder piston pivot drive valve actuator mechanism is disclosed in DE-OS 42 39 423. A drive mechanism including two cylinder piston units with associated control valves is disclosed in DE 40 33 663.

These known types of actuation systems can operate the flap member over a total pivoting angle with the necessary torque and therefore move a tension lever or levers through required angles of rotation of approximately between 170° and 210°. However, all of these known actuation systems have major disadvantages. Electrical actuators operate relatively slowly and installation thereof is expensive. Double cylinder pivot drive valve actuators or cylinder piston units shifted by special valve devices are expensive to install and are susceptible to failure.

SUMMARY OF THE INVENTION

Accordingly, it is an object of the present invention to provide an improved actuator for a flap valve of the type described above, but whereby it is possible to eliminate the above and other prior art disadvantages.

It is a further object of the present invention to provide such an improved flap valve and actuator therefor that may be driven during operation in a simple manner and that may be controlled by a cylinder piston drive in as fail-safe and trouble-free manner as possible with relatively short switching times for operation of the flap member.

These objects are achieved in accordance with the present invention by the provision that the drive shaft is located such that the axis thereof is positioned relative to the axis about which the flap member rotates to ensure that an angle of rotation of the tension lever to move the flap member between the two extreme positions thereof is between 90° and 150°. Particularly, the drive shaft in accordance with the present invention is displaced from conventional positions thereof in a direction toward the axis about which the flap member is pivotable. This displacement or relocation of the drive shaft in accordance with the present invention ensures that the tension lever is moved through a reduced angle of rotation in accordance with the present invention, compared with the extent of rotation necessary in conventional arrangements. The limitation of the angle of rotation of the tension lever in accordance with the present invention makes it possible to reciprocally drive the tension lever of the present invention with a single cylinder piston unit, since the working stroke of such single unit is sufficient to achieve rotation between the reduced angular range in accordance with the present invention. Such a drive is known to be very rugged and can be shifted quickly due to the simple structural arrangement thereof. Therefore, reliability of the flap valve itself is achieved. According to the torque on the drive shaft achieved in such manner, a rotation angle of the tension lever and drive shaft of between 125° and 130° is preferred in accordance with one aspect of the present invention. In order to obtain this value of angle of rotation, the invention provides that the distance between the axis of rotation of the drive shaft and the pivoting axis of the flap member is proportioned so that it is equal to approximately one-sixth of the transverse dimension of the internal conductor cross section, i.e. of a transverse dimension of a conductor passage through the housing. This simple structural arrangement makes it possible to limit the angle of rotation of the tension lever in accordance with the present invention.

It is of advantage that the tension lever and the joint rod have approximately the same length. Thereby it is possible to achieve the above preferred angle of rotation. Also, when the lever system is fully operated, the tension lever and the joint rod will be inclined at equal angles to a line that is parallel to an axial center of the conductor passage blocked by the flap member.

In accordance with another aspect of the present invention, however, it is possible for the tension lever to have a length that is greater than the length of the joint rod. This makes it possible to even further reduce the angle of rotation of the tension lever and drive shaft between the extreme positions of the flap member, and can result when a slightly higher torque can be used to operate the flap member under certain working conditions. In such arrangement, when the flap member is in one extreme position thereof, the joint rod extends parallel to an axial center of a conductor passage blocked by the flap member.

These measures allow the use of a cylinder piston system comprising two, generally parallel, synchronously operated cylinder piston units which act in opposition to one another on respective arms of a two-arm lever fixed to the drive shaft. In this manner it is possible to actuate the drive shaft without flexure moments. However, according to the present invention it also obviously is possible to actuate the drive shaft by use of a single cylinder piston unit acting on a lever fixed to the drive shaft, since the working stroke of a single cylinder piston unit is sufficient to shift the drive shaft and tension lever through the reduced required angle of rotation achieved in accordance with the present invention.

BRIEF DESCRIPTION OF THE DRAWINGS

Other objects, features and advantages of the present invention will be apparent from the following detailed description of preferred embodiments thereof, with reference to the accompanying drawings, wherein:

FIG. 3 is a view similar to FIG. 1 but of a further embodiment of the present invention.

DETAILED DESCRIPTION OF THE INVENTION

Figure 1:
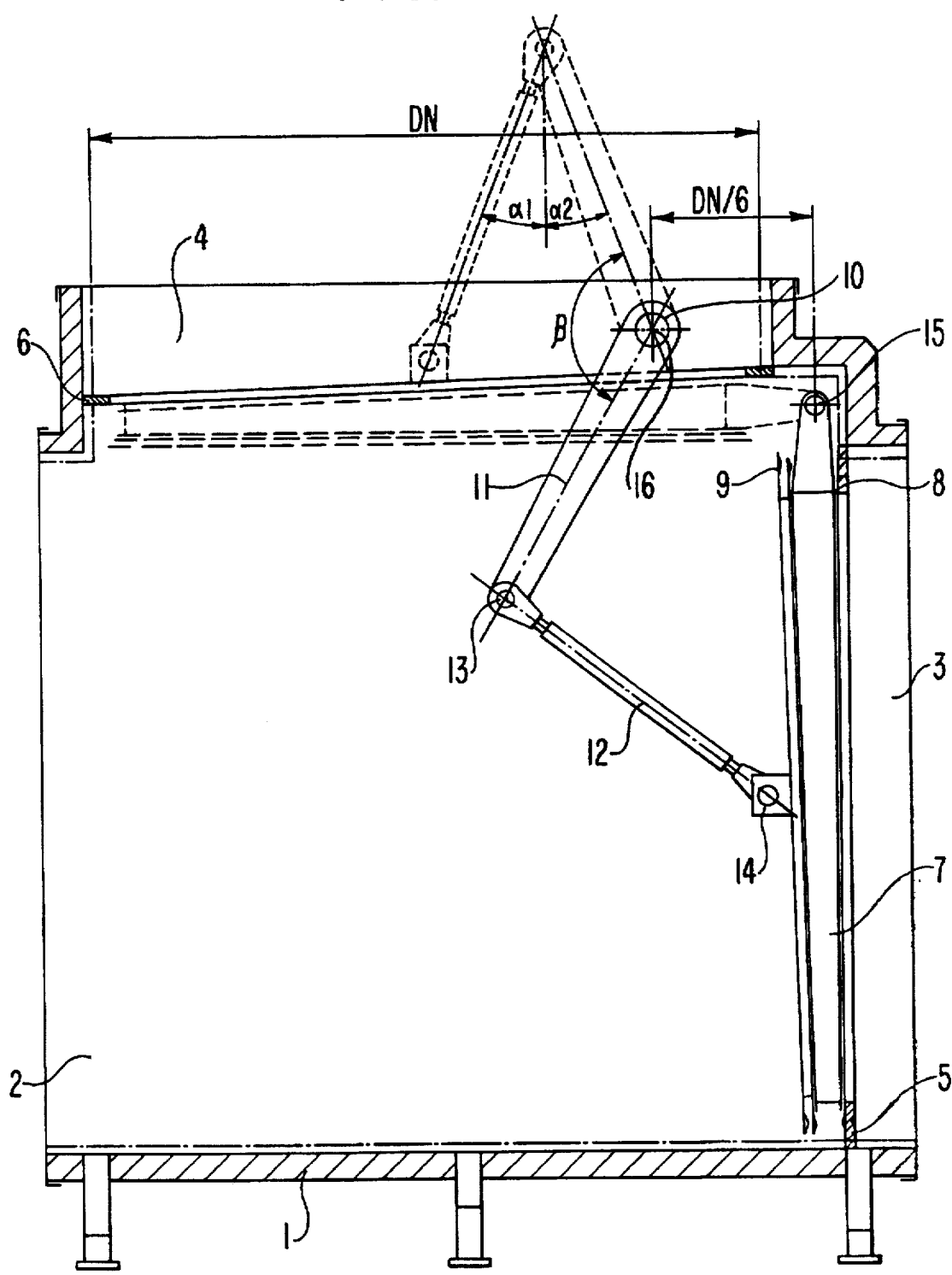
FIG. 1 is a somewhat schematic, cross sectional view through a flap valve constructed in accordance with a first embodiment of the present invention.

A flap valve shown in FIG. 1 includes a valve housing 1 having three conductor connections 2, 3, 4. Conductor connections 3 and 4 are provided with sealing seats 5, 6 respectively. A flap wing or member 7 with respective sealing members 8, 9 is mounted in housing 1 for reciprocal pivoting movement through an angle of approximately 90° about a shaft defining a first pivot axis 15. Thus, flap member 7 is pivotable between two extreme positions. One position is shown by solid lines in FIG. 1 whereat seal member 8 is pressed against and seals with seat 5, thereby blocking conductor connection 3. In another position of the flap member, shown in dashed lines, flap member 7 is pivoted such that seal member 9 is pressed against and seals with seat 6, thereby blocking conductor connection 4.

Flap member 7 is moved between the extreme positions thereof by a drive shaft 10 defining an axis 16, by a tension or pressure lever 11 fixed to shaft 10, and by a joint link or rod 12 pivoted at one end 13 thereof at lever 11 and at an opposite end 14 thereof to flap member 7, and specifically at a position generally centrally axially thereof. Thus, rotation of drive shaft 10 in opposite directions about axis 16 will move lever 11 through an angle of rotation sufficient to cause rod 12 to move flap member 7 between the two extreme positions thereof. The pivoting axis 15 of flap member 7 is located adjacent a juncture between conductor connections 3 and 4 and at an outer edge of flap member 7. The drive shaft 10 is located in the area of conductor connection 4 so that the distance between the axis of rotation 16 of drive shaft 10 and the axis of rotation 15 of the pivot shaft of flap member 7 is approximately equal to one-sixth of the nominal dimension DN of the inside conductor cross section of conductor connection 4. Drive shaft 10 is positioned slightly spaced from the plane of sealing seat 6. In the extreme position shown by dashed lines, i.e. wherein flap member 7 blocks conductor connection 4, and corresponding to a fully operated position of tension lever 11, rotation axis 16 of drive shaft 10 and the axis of pivotal connection of end 14 of rod 12 are approximately equally spaced from the plane of sealing seat 6.

In the embodiment of FIG. 1, lever 11 and rod 12 have approximately the same length. Thus, in the fully operated position shown by dashed lines, lever 11 and rod 12 both are inclined at equal angles $\alpha_1$, $\alpha_2$ to a line that is parallel to an axial center of a conductor passage through conductor connection 4 and blocked by flap member 7. Further, in this embodiment, the angle of rotation $\beta$ of lever 11 to move flap member from the two extreme positions thereof is between 90° and 150°, preferably approximately 125° to 130°.

Figure 2:
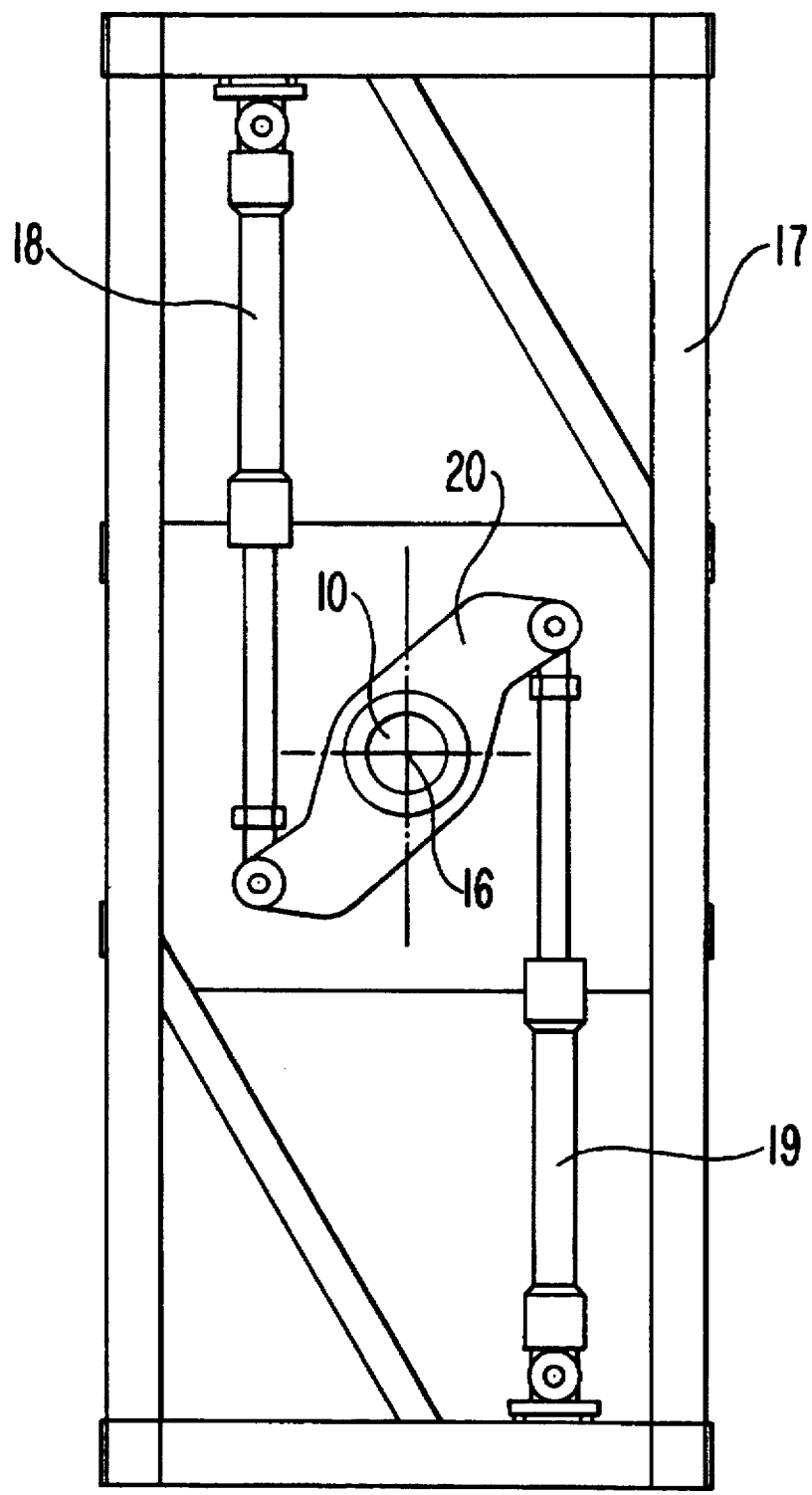
FIG. 2 is a view of an actuator system for operating the flap valve of FIG. 1.

With reference to FIG. 2, there is illustrated a system for reciprocal rotation of shaft 10 about axis 16 to achieve movement of flap member 7 between the two extreme positions thereof. A frame 17 supports two cylinder piston units 18, 19 that extend generally parallel to each other and to frame 17. Piston rods of units 18, 19 engage respective arms of a two-arm actuation lever 20 that is fixed to and rotatable with drive shaft 10. Cylinder piston units 18, 19 operate synchronously and in opposition to each other. A working stroke of the two pistons is calculated so that the two-arm actuation lever 20 will rotate through angle of rotation $\beta$ as defined above, preferably about 125° to 130°, due to actuation of each one of the cylinder piston units 18, 19. Therefore, drive shaft 10 is actuated without flexure moments due to synchronous and opposed operation of units 18, 19.

With reference to FIG. 3, a second embodiment of the present invention now will be described. The main difference between the embodiment of FIG. 3 and that of FIG. 1 is that in FIG. 3 the tension lever 11 has a length greater than the length of joint rod 12. The length difference between lever 11 and rod 12 is calculated so that for the extreme position when the lever system is fully operated, i.e. shown by dashed lines in FIG. 3, joint rod 12 coincides with an axial center of a conductor passage through conductor connection 4 ($\alpha_1$ of FIG. 1 equals 0) while tension lever 11 is inclined at an angle $\alpha_2$ that is equal to the angle $\alpha_2$ of FIG. 1. According to chosen lengths for lever 11 and rod 12, with the distance between axes 15, 16 maintained at DN/6, it is possible for angle of rotation $\beta$ of lever 11 to be about 110° to 115°, i.e. smaller than the rotation angle achieved with the embodiment of FIG. 1. A further simplification of actuation results, because the cylinder piston units 18, 19 can operate with even a shorter working stroke. Therefore, the resulting increase of necessary maximum torque easily can be reinforced.

Although the present invention has been described and illustrated with respect to preferred features thereof, it is to be understood that various modifications and changes may be made to the specifically described and illustrated features without departing from the scope of the present invention.

We claim:

1. A flap valve for use in a conductor of large cross section, said valve comprising:

a valve housing;

a flap member mounted in said housing for pivoting movement about a first axis through an angle of approximately 90° between two extreme positions;

a drive shaft mounted in said housing for rotation about a second axis;

a tension lever fixed to said drive shaft and rotatable therewith about said second axis;

a joint rod pivoted at a first end thereof to said tension lever and at a second end thereof to said flap member at a position substantially centrally thereof;

such that rotation of said drive shaft and said tension lever about said second axis moves said joint rod, thereby pivoting said flap member about said first axis from one said extreme position to the other said extreme position; and said second axis extending parallel to said first axis and being located at a position between said first axis and a center of a conductor passage through said housing, and an angle of rotation of said tension lever to move said flap member between said two extreme positions thereof being between 90° and 150°.

2. A flap valve as claimed in claim 1, wherein said angle of rotation is approximately 125° to 130°.

3. A flap valve as claimed in claim 2, wherein said tension lever and said joint rod are of approximately the same length.

4. A flap valve as claimed in claim 2, wherein at a first said extreme position of said flap member said tension lever and said joint rod are inclined at equal angles to a line parallel to an axial center of said conductor passage.

5. A flap valve as claimed in claim 1, wherein said tension lever and said joint rod are of approximately the same length.

6. A flap valve as claimed in claim 1, wherein at a first extreme position of said flap member said tension lever and said joint rod are inclined at equal angles to a line parallel to an axial center of said conductor passage.

7. A flap valve as claimed in claim 1, wherein said angle of rotation is approximately 110° to 115°.

8. A flap valve as claimed in claim 7, wherein said tension lever has a length longer than that of said joint rod.

9. A flap valve as claimed in claim 8, wherein at a first extreme position of said flap member said joint rod extends parallel to an axial center of said conductor passage.

10. A flap valve as claimed in claim 1, wherein said tension lever has a length longer than that of said joint rod.

11. A flap valve as claimed in claim 1, wherein at a first said extreme position of said flap member said joint rod extends parallel to an axial center of said conductor passage.

12. A flap valve as claimed in claim 1, wherein a distance between said first axis and said second axis is approximately equal to ⅙ of a transverse dimension of a conductor passage through said housing.

13. A flap valve as claimed in claim 1, further comprising an actuating lever fixed to said drive shaft, and a cylinder piston unit connected to said actuating lever to reciprocate said drive shaft about said second axis.

14. A flap valve as claimed in claim 1, further comprising a double-arm lever fixed to said drive shaft, and two generally parallel cylinder piston units connected to respective arms of said double-arm lever to reciprocate said drive shaft about said second axis.

15. A flap valve as claimed in claim 1, wherein said second axis is closer to said first axis than to said center of said conductor.

* * * * *